May 3, 1966  C. J. McDOWALL  3,249,187
ONE WAY POSITIVE CLUTCH CONNECTED IN PARALLEL WITH
OVERLOAD RELEASE FRICTION COUPLING
Filed Feb. 26, 1964

INVENTOR.
Charles J. McDowall
BY
Paul Fitzpatrick
ATTORNEY

United States Patent Office 3,249,187
Patented May 3, 1966

3,249,187
ONE WAY POSITIVE CLUTCH CONNECTED IN PARALLEL WITH OVERLOAD RELEASE FRICTION COUPLING
Charles J. McDowall, Indianapolis, Ind., assignor to General Motors Corporation, Detroit, Mich., a corporation of Delaware
Filed Feb. 26, 1964, Ser. No. 347,604
2 Claims. (Cl. 192—48)

My invention relates to safety couplings, by which I mean a type of device which couples an engine to a load for transmission of unlimited torque in one direction and for transmission of substantial but definitely limited torque in the other direction. These devices are different from the usual one-way or overrunning clutch which transmits no significant reverse torque. Such safety couplings find use in gas turbine propeller power plants for aircraft in which, if the engine fails, it is necessary to decouple the propeller from the engine to prevent heavy braking forces on the aircraft. A mere overrunning clutch is not suitable because it is desired to have the propeller windmill and drive the engine so long as the load is not unduly great, as it would be with a failed engine. For example, it may be desirable to crank the engine by windmilling the propeller, or to use the engine-propeller combination to provide some drag on the aircraft during landing or diving maneuvers.

One form of such a safety coupling is disclosed and claimed in my copending application for "Safety Coupling," Serial No. 55,262, filed September 12, 1960 (Patent No. 3,191,732). My present invention is directed to providing a simpler device for the same purpose as that of the prior application.

The nature of the present invention and the advantages of it will be apparent from the succeeding description of the preferred embodiment and the accompanying drawings.

Figure 1:
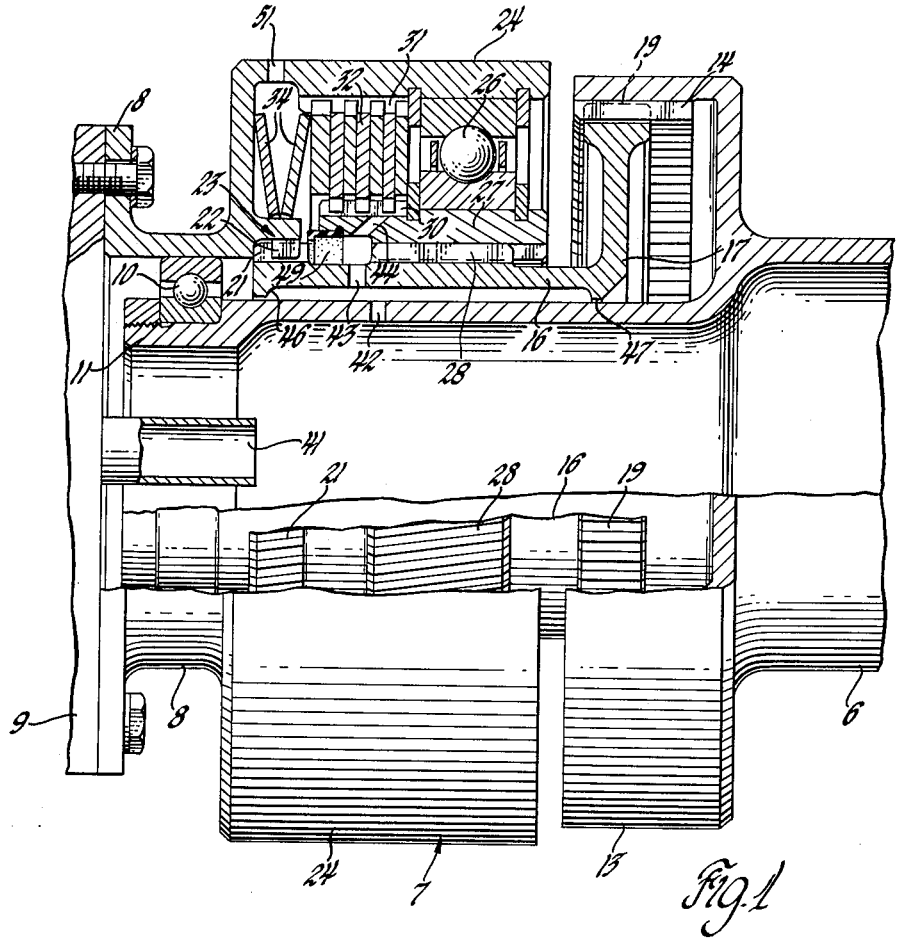
FIGURE 1 is a longitudinal sectional view taken on a plane containing the axis of the coupling, with parts broken away, showing the clutch in the engaged condition.

Referring first to FIGURE 1, this illustrates an engine-driven shaft 6 which feeds power to a safety coupling 7. The safety coupling 7 drives a second shaft 8 which, in turn, drives a propeller (not illustrated). It will be understood that propeller drives in practice include reduction gears not shown here. A gear driven by shaft 8 is indicated by its hub 9. Such reduction gears would ordinarily be between the safety coupling and propeller so that the safety coupling turns at engine speed. Reduction gears of suitable types are well known, among them being that illustrated in U.S. Patent No. 2,936,655.

Figure 2:
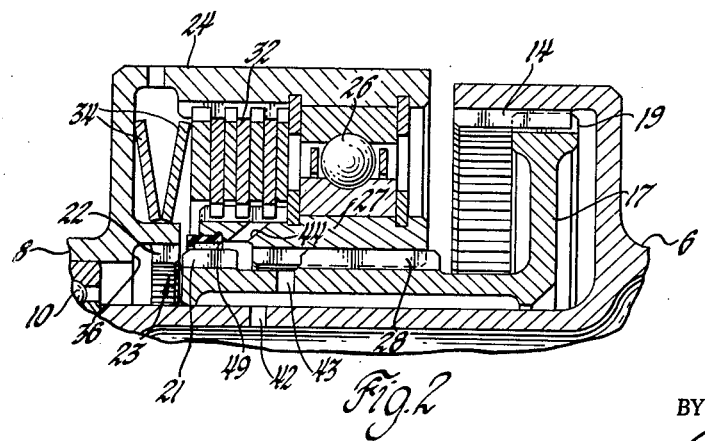
FIGURE 2 is a partial view similar to FIGURE 1, showing the clutch in the disengaged condition.

The first, input, or driving shaft 6 is shown at the right and the second, output, or driven shaft 8 is shown at the left. The first shaft 6 is maintained in axial and radial alignment with the second shaft 8 by a ball bearing 10 mounted between the shaft 8 and the reduced forward portion 11 of the first shaft. The first shaft 6 has also integral with it an enlarged cup-like portion 13 having straight internal splines 14. A first intermediate member 16 of generally cylindrical configuration includes a radial flange 17 having a rim bearing straight splines 19 meshing with the splines 14 on the first or driving member 6. The first intermediate member 16 also bears helical external splines 21 at its forward end, which mesh with helical internal splines 22 on the interior of the second or driven shaft 8. Splines 21 and 22 constitute a positive or dog clutch 23, the helix angle of the splines being such that torque in the normal direction, that is, in the direction in which the engine drives the propeller, urges the intermediate member 16 to the left as shown in the drawings and thereby urges the dog clutch 23 into engagement. In other words, the clutch 23 will remain in engagement with a normal direction of torque but, if torque between the engine and propeller reverses, the reverse torque urges the intermediate member 21 to the right as shown in the drawing to disengage the clutch 23. The length of splines 14 on the driving member 6 is such that the dog clutch 23 may disengage, as shown in FIGURE 2, while the splines 14, 19 remain in engagement.

The second or driven shaft 8 is integral with an outer clutch drum 24 which is coupled through a ball thrust bearing 26 with a second intermediate member 27. Ball bearing 26 is axially located in the drum 24 and on the second intermediate member 27 by snap rings. The second intermediate member 27 has helical internal splines which cooperate with helical external splines 28 on the central portion of the first intermediate member 16. Splines 28 are twisted in the same direction as splines 21, and preferably are at the same helix angle, although not necessarily so. The second intermediate member 27 bears external splines 30 and the drum 24 bears internal splines 31. A predetermined-friction clutch 32 comprises a plurality of plates coupled to the members 27 and 24 by the splines 30 and 31. The plates of clutch 32 are biased into engagement to a predetermined degree by two back-to-back Belleville springs 34. It will be seen that with the constant pressure on the clutch plates, the torque required to rotate the second intermediate member 27 with respect to the driven shaft 8 is a substantially constant predetermined amount. This torque is the desired maximum reverse torque.

Provisions for lubricating the structure, and particularly the friction clutch, include an oil supply pipe 41 discharging into the interior of hollow shaft portion 11. Oil flows by centrifugal force through ports 42 in the shaft portion 11, ports 43 in intermediate member 16, and ports 44 in second intermediate member 27 to the clutch 32.

Ridges 46 and 47 on the interior of member 16 control the apportioning of oil between clutch 32, bearing 10, and splines 14, 19. Dog clutch 23 and splines 28 receive some oil, and bearing 26 is supplied oil from clutch 32. A ring 49 controls flow out the left end of member 27. Oil is exhausted through outer port 51. The shaft 11 may be plugged to provide for pressure feed rather than centrifugal feed, if desired.

Operation

If the drive is operating in the normal fashion and, for example, the engine driving shaft 6 fails and the propeller driving shaft 9 continues to rotate under the action of the apparent wind, the torque will reverse, and the reverse torque acting upon the splines 21 will disengage the positive clutch 23. This action also moves the helical splines 28 within the second intermediate member, as illustrated in FIGURE 2, but without disengaging the connection between the first and second intermediate members. The first intermediate member 16 also remains rotatively coupled to the normally driving shaft 6 through the splines 14, 19. The only connection between the engine and the propeller thus remaining is the predetermined-friction clutch 32. This clutch will transmit torque from the propeller to the engine to brake the aircraft, or to start the engine, up to the limit preset by the friction characteristics of the plates and the force of the biasing springs 34. Beyond this torque, the friction clutch will slip. However, it slips without ratcheting or other destructive action such as occurs when a dog clutch slips or overruns.

Now, assuming the clutch 21, 22 is disengaged, as shown in FIGURE 2, and the engine is started, or the power of the engine increases, or the power input from the propeller decreases so that the reverse torque diminishes, the members 27 and 8 are coupled together for concurrent rotation through the friction clutch 32. The drive from the shaft 6 into the friction clutch is through the first intermediate member 16 and thus through the helical splines 28. These splines, in the normal direction of torque, bias the first intermediate member 16 to the left, as shown in the drawings; that is, in the direction to engage the positive or dog clutch 23, and tend to synchronize the driving and driven members. Thus, the splines 21 readily move into engagement within the splines 22 and the increase of torque as the engine power increases drives the helical dog clutch into full engagement where the forward end of the intermediate member 16 engages the shoulder at 36 on the driven member.

The advantages of my present safety coupling will be apparent. It transmits unlimited torque in one direction, and relatively precisely limited torque in the reverse direction. Overrunning of the propeller is accomplished simply by friction of the multiple-plate clutch and there is no ratcheting or other destructive action between the elements of the positive clutch which are used for normal torque.

It will be apparent that many modifications of structure may be made by the exercise of skill in the art without departing from the principles of my invention.

I claim:
1. A safety coupling comprising, in combination,
a first rotatable end member,
a second end member rotatable coaxially with the first end member,
first and second intermediate members rotatable coaxially with the end members,
spline means mounting the first intermediate member on the first end member for movement axially thereof,
a positive clutch between the first intermediate member and the second end member engageable and disengageable by said axial movement,
the positive clutch including means biasing the clutch into engagement in response to torque through the positive clutch in one direction and out of engagement in response to such torque in the other direction,
the biasing means maintaining the positive clutch in engagement when torque between the first and second members is in the said one direction and disengaging the positive clutch when torque is in the said other direction,
means coupling the second intermediate member to the second end member for relative rotation and preventing relative axial movement thereof,
a predetermined-friction clutch constantly coupling the second intermediate member to the second end member, and
helical coupling means coupling the two intermediate members for concurrent relative axial and rotational movement, biasing the first intermediate member in the positive-clutch-engaging direction in response to torque in the said one direction and in the positive-clutch-disengaging direction in response to torque in the said other direction,
the predetermined-friction clutch transmitting torque up to its predetermined friction limit in the said other direction.

2. A safety coupling comprising, in combination,
a first rotatable end member,
a second end member rotatable coaxially with the first end member,
first and second intermediate members rotatable coaxially with the end members,
spline means mounting the first intermediate member on the first end member for movement axially thereof,
a positive clutch between the first intermediate member and the second end member engageable and disengageable by said axial movement,
the positive clutch including helical members biasing the clutch into engagement in response to torque through the positive clutch in one direction and out of engagement in response to such torque in the other direction,
the helical members maintaining the positive clutch in engagement when torque between the first and second members is in the said one direction and disengaging the positive clutch when torque is in the said other direction,
means coupling the second intermediate member to the second end member for relative rotation and preventing relative axial movement thereof,
a predetermined-friction clutch constantly coupling the second intermediate member to the second end member, and
helical coupling means coupling the two intermediate members for concurrent relative axial and rotational movement, biasing the first intermediate member in the positive-clutch-engaging direction in response to torque in the said one direction and in the positive-clutch-disengaging direction in response to torque in the said other direction,
the predetermined-friction clutch transmitting torque up to its predetermined friction limit in the said other direction.

References Cited by the Examiner

UNITED STATES PATENTS

| 2,699,855 | 1/1955 | Barlow et al. | 192—53.2 |
| 2,976,974 | 3/1961 | Blyth | 192—54 X |

FOREIGN PATENTS

| 652,502 | 11/1961 | Canada. | |

DON A. WAITE, *Primary Examiner.*